US012148972B2

(12) United States Patent
Gäbler

(10) Patent No.: US 12,148,972 B2
(45) Date of Patent: Nov. 19, 2024

(54) RF DEVICE COMPRISING PLURAL TRANSITION UNITS ARRANGED IN TWO OR MORE OFFSET ROWS FOR COUPLING DIFFERENTIAL TRANSMISSION LINE PAIRS TO HOLLOW WAVEGUIDES

(71) Applicant: BEIJING BOE SENSOR TECHNOLOGY CO., LTD., Beijing (CN)

(72) Inventor: Alexander Gäbler, Darmstadt (DE)

(73) Assignee: BEIJING BOE SENSOR TECHNOLOGY CO., LTD., Beijing (CN)

( * ) Notice: Subject to any disclaimer, the term of this patent is extended or adjusted under 35 U.S.C. 154(b) by 287 days.

(21) Appl. No.: 17/761,132

(22) PCT Filed: Sep. 18, 2020

(86) PCT No.: PCT/EP2020/076124
§ 371 (c)(1),
(2) Date: Mar. 16, 2022

(87) PCT Pub. No.: WO2021/053153
PCT Pub. Date: Mar. 25, 2021

(65) Prior Publication Data

US 2022/0407209 A1 Dec. 22, 2022

(30) Foreign Application Priority Data

Sep. 18, 2019 (EP) .................................... 19198157

(51) Int. Cl.
*H01P 5/107* (2006.01)
*H01P 3/08* (2006.01)
*H01P 3/12* (2006.01)

(52) U.S. Cl.
CPC ................ *H01P 5/107* (2013.01); *H01P 3/08* (2013.01); *H01P 3/12* (2013.01)

(58) Field of Classification Search
CPC ................................ H01P 5/107; H01P 5/103
(Continued)

(56) References Cited

U.S. PATENT DOCUMENTS 6,160,454 A 12/2000 Buer et al.
6,700,456 B2 * 3/2004 Okude .................... H01P 5/107 333/26

(Continued)

FOREIGN PATENT DOCUMENTS

| | | | |
|---|---|---|---|
| CN | 109818124 | A | 5/2019 |
| GB | 1059547 | A | 2/1967 |
| JP | S6216603 | A | 1/1987 |

OTHER PUBLICATIONS

Gäbler, Copending U.S. Appl. No. 17/761,120, national phase entry of PCT/EP2020/075941.

(Continued)

*Primary Examiner* — Benny T Lee
(74) *Attorney, Agent, or Firm* — Dilworth & Barrese, LLP; Michael J. Musella, Esq.

(57) ABSTRACT

A transition unit of a radio frequency device provides a transition between a planar differential pair transmission line and a hollow radio frequency waveguide. A substrate layer arrangement with a planar differential pair transmission line is arranged on one or more surfaces of at least one substrate layer. An end section of the transmission line is configured as a radio frequency signal emission pattern. The transition unit has an end section of a waveguide for electromagnetic waves that is attached to the substrate layer arrangement and superposes the radio frequency signal emission pattern. The waveguide is directed perpendicular to the substrate layer arrangement. An open end of the end section of the wave- (Continued)

guide is attached to a first outer surface or a second outer surface of the substrate layer arrangement. Opposite to the end section a back cavity is attached with an open end towards the substrate layer arrangement.

5 Claims, 3 Drawing Sheets

(58) Field of Classification Search
USPC ............................................................ 333/26
See application file for complete search history.

(56) References Cited

U.S. PATENT DOCUMENTS

| | | | | |
|---|---|---|---|---|
| 6,707,348 | B2 * | 3/2004 | Ammar | H01P 5/107<br>333/125 |
| 9,203,132 | B2 * | 12/2015 | Niman et al. | H01Q 9/285 |
| 2017/0187094 | A1 * | 6/2017 | Cook et al. | H01Q 1/2283 |
| 2017/0222323 | A1 | 8/2017 | Brown | |

OTHER PUBLICATIONS

Novel Near-Field Millimeter-Wave Differential Probe Using a Loaded Modulated Aperture, Authors: Abou-Khousa M A, Kharkovsky S, Zoughi R, Publication data: IEEE Transactions on Instrumentation and Measurement,,May 1, 2009,IEEE, USA, Source info: vol. 58, Nr: 5, pp. 1273-1282.

Ortner, Markus, Ziqiang Tong, and Timm Ostermann. "A millimeter-wave wide-band transition from a differential microstrip to a rectangular waveguide for 60 GHz applications." In Proceedings of the 5th European Conference on Antennas and Propagation (EUCAP), pp. 1946-1949. IEEE, 2011.

* cited by examiner

RF DEVICE COMPRISING PLURAL TRANSITION UNITS ARRANGED IN TWO OR MORE OFFSET ROWS FOR COUPLING DIFFERENTIAL TRANSMISSION LINE PAIRS TO HOLLOW WAVEGUIDES

TECHNICAL FIELD

The disclosure relates to a radio frequency device with a transition unit providing a transition between a planar differential pair transmission line and a hollow radio frequency waveguide.

BACKGROUND

Several applications for electromagnetic waves and corresponding signals require low loss transmission or low loss distribution of radio frequency signals, or both. Hollow waveguides, as e.g. a rectangular waveguide, feature this behavior and are commonly used in this regard. However, further signal processing usually requires a transition to a planar substrate where, depending on the purpose, several kinds of planar transmission lines are commonly used. The coupling of radio frequency waves between hollow waveguides and planar transmission lines depends on the kind of planar transmission line that is used for signal transmission along a planar substrate layer. Different kinds of planar transmission lines include e.g. a microstrip transmission line or a differential pair transmission line. Nevertheless, the majority of published work focuses to the radio frequency signal transition from a hollow waveguide into the microstrip mode.

A planar differential pair transmission line can be arranged on two opposing surfaces of a single substrate layer. In this case the substrate layer arrangement comprises at least the single substrate layer, but may also comprise additional substrate layers dedicated to other means or functions. It is also possible to arrange different sections of a planar differential pair transmission line at surfaces of two or even more different substrate layers of a substrate layer arrangement that comprises these two or more different substrate layers. In recent developments, a planar differential pair transmission line is arranged on two surfaces of two substrate layers made of e.g. glass, whereby the two substrate layers are arranged at a distance relative to each other. Sections of the planar differential pair transmission line are arranged at the two surfaces of the two substrate layers that face each other. In case a material with variable and controllable dielectric characteristics is arranged inside between the two substrate layers, the signal transmission characteristics of the planar differential pair transmission line can be modified.

Several possibilities of transitions into the differential strip line mode are also known from literature, but such transitions are affected by detrimental characteristics and constraints. Usually, such transitions suffer from bandwidth limitations. In many cases the already known transitions require vias within the substrate layer arrangement which are not only costly but also are not easily applicable to all substrate technologies used, e.g. multilayer glass. These substrates are also comparable bulky, which limits the application to either one single transition or multiple transitions which are geometrically well separated. Furthermore, such transitions usually require the insertion of at least one substrate layer of the substrate layer arrangement into the waveguide, which limits the placement of the transition to edge or corner points of the substrate.

However, for many applications, more tightly spaced transition points are required without the limitation to substrate edges and without the need of radiation suppressing vias over a larger bandwidth. Thus, there is a need to provide for a transition unit that allows for a highly efficient transition of the radio frequency signal, and that is easily manufactured and does not require much space.

SUMMARY OF THE INVENTION

The disclosure relates to a radio frequency device with a transition unit providing a transition between a planar differential pair transmission line and a hollow radio frequency waveguide. The radio frequency device comprises a substrate layer arrangement with a planar differential pair transmission line arranged on one or more surfaces of at least one substrate layer of the substrate layer arrangement. The transition unit comprises an end section of the differential pair transmission line that is configured as a radio frequency signal emission pattern. The transition unit further comprises an end section of the waveguide for radio frequency electromagnetic waves that is attached to the substrate layer arrangement and that superposes the radio frequency signal emission pattern.

The end section of the waveguide is directed perpendicular to the first surface of the first substrate layer, whereby an open end of the end section of the waveguide is attached to a top surface or a back surface of the substrate layer arrangement and superposes the radio frequency signal emission pattern, whereby opposite to the end section of the waveguide, a back cavity is attached with an open end of the back cavity facing the substrate layer arrangement, and whereby the back cavity prevents a part of the radio frequency signal emission that is emitted from the emission pattern from leaking outside of the end section of the waveguide. By mounting the open end with an opening of the end section of the waveguide on a surface of a substrate layer of the substrate layer arrangement, the transition unit can be arranged at an arbitrary position within the surface of the substrate layer arrangement. There is no need to arrange the transition unit at a border or edge of the respective substrate layer. Thus, the invention allows for more options and less space restrictions related to the design of the radio frequency device. A back cavity can be easily and cost-effectively manufactured. Many radio frequency devices require complex hollow waveguide structures that can be arranged on one or both sides of the substrate layer, which facilitates the design and manufacture of additional back cavities. By adding a back cavity at the appropriate spot on the opposing surface of the substrate layer arrangement, the efficiency of the transition between the hollow waveguide and the planar differential pair transmission line can be significantly enhanced, i.e. unwanted radio frequency signal emission leaking outside of the end section of the waveguide can be reduced. Such a transition unit is considered advantageous over the prior art, especially with respect to radio frequency signal transitions from the planar differential pair transmission line into the adjacent hollow waveguide.

According to an advantageous embodiment, a distance between the planar differential pair transmission line and a back side of the back cavity that opposes the substrate layer is larger than at least one distance between opposing parts around the open end of back cavity. For many applications it is considered advantageous to provide for a large distance between a back side of the back cavity and the planar differential pair transmission line, which helps to reduce the leakage of radio frequency signal emission from the transition unit. During design of the radio frequency device, there will usually be a trade-off between space requirements for the back cavity and enhancement of the signal transition efficiency.

According to an aspect, the end section of the waveguide is a first end section of a first waveguide, and the back cavity is a second end section of a second waveguide that is directed into an opposite direction of the first end section of the first waveguide, whereby a part of the radio frequency signal emission that is emitted from the emission pattern is transmitted into the second end section of the second waveguide. Thus, the back cavity is not only used as a means for suppressing unwanted leakage of the radio frequency signal at this special region of the radio frequency device, but allows for an additional benefit of creating a branching of the signal transmission without need for additional branching components. The first and second waveguides can be used to transmit the radio frequency signal towards different components of the radio frequency device. It is also possible to reunite the first and second waveguides and to superimpose the two branches of the radio frequency signal into a single combined radio frequency signal.

According to a further aspect, a cross-section area of the open end of the back cavity and a cross-section area of the open end of the end section of the waveguide are identical and the open end of the back cavity superposes the open end of the end section of the waveguide. By matching the design and position of the end section of the waveguide and the back cavity, the electrical boundary conditions for the transition of the radio frequency signal can be modified and optimized in order to reduce unwanted leakage of the radio frequency signal emission from the transition unit, which will also enhance the transmission efficiency.

For many applications, it is advantageous or even mandatory to arrange several transition units onto a single substrate layer arrangement. In yet another embodiment the radio frequency device comprises several transition units arranged adjacent to each other. The arrangement of hollow waveguides with similar signal power, during use of the radio frequency device, adjacent to each other imposes additional electrical boundary conditions for the radio frequency signal emission that contribute to the reduction of unwanted signal leakage from each of the transition units. In the same manner the arrangement of back cavities adjacent to each other and opposite to the respective open ends of the corresponding end sections of the hollow waveguides also imposes additional electrical boundary conditions that reduce unwanted leakage and thus improve the efficiency for the transition of the radio frequency signal between the planar transmission line and the hollow waveguide. The arrangement of several transition units adjacent to each other as well as the design and position of each transition unit can be easily modified and adapted to the respective needs related to the radio frequency device in question, as well as to the intended transition efficiency for the radio frequency signals that are transmitted within the radio frequency device.

For many applications, the diameter of a hollow waveguide will be less than a preferred distance between adjacent hollow waveguides that depends on the wavelength of the radio frequency signal and results in favorable electrical boundary conditions for reducing unwanted leakage. Thus, a preferred arrangement of adjacent transition units might require some distance between adjacent hollow waveguides and the respective transition units.

According to yet another aspect, several transition units are arranged in two or more rows arranged in parallel and spaced at a distance from each other. By arranging several transition units in two or more rows, the total surface area that is required for mounting this number of transition units onto the surface of the substrate layer can be reduced in comparison to a single row of transition units. Thus, two or more rows of transition units allow for a compact and space-saving arrangement of a large number of transition units, and also allow for very favorable electric boundary conditions that result from arranging similar transition units along a straight line and adjacent to each of the neighboring transition units.

In yet another embodiment, the distance between adjacent transition units of at least one row is larger than or identical to the lateral extension of the transition units, and whereby at least some of the transition units of a neighboring row are arranged within a corresponding gap between adjacent transition units of the at least one row. The distance between a first transition unit and a second transition unit within the at least one row can be used for arranging planar transition lines connected to the transition units of a neighboring row. The hollow waveguides of the transition units of the neighboring row can also be arranged in a manner as to improve the electrical boundary conditions for the transition units of the at least one row, and vice versa.

According to a favorable aspect, the design of two or more back cavities that are arranged adjacent to each other is identical. Furthermore, it is also considered advantageous that the design of two or more end sections of the waveguides that are arranged adjacent to each other is also identical. By matching the design and position of the end sections of the waveguides or of the corresponding back cavities or of both, the electrical boundary conditions for the transition of the radio frequency signal that is transmitted through each of the transition units are advantageous and support a very efficient transition of the radio frequency signal by reducing most of the unwanted leakage of the radio frequency signal emission from the respective transition unit. The favorable electrical boundary conditions can be preset by arranging a number of identical transition units adjacent to each other along a straight line or curved row.

BRIEF DESCRIPTION OF DRAWINGS

The present invention will be more fully understood, and further features will become apparent, when reference is made to the following detailed description and the accompanying drawings. The drawings are merely representative and are not intended to limit the scope of the claims. In fact, those of ordinary skill in the art may appreciate upon reading the following specification and viewing the present drawings that various modifications and variations can be made thereto without deviating from the innovative concepts of the invention. Like parts depicted throughout the detail description of the drawings are referred to by the same reference numerals.

DETAILED DESCRIPTION OF THE INVENTION

Figure 1:
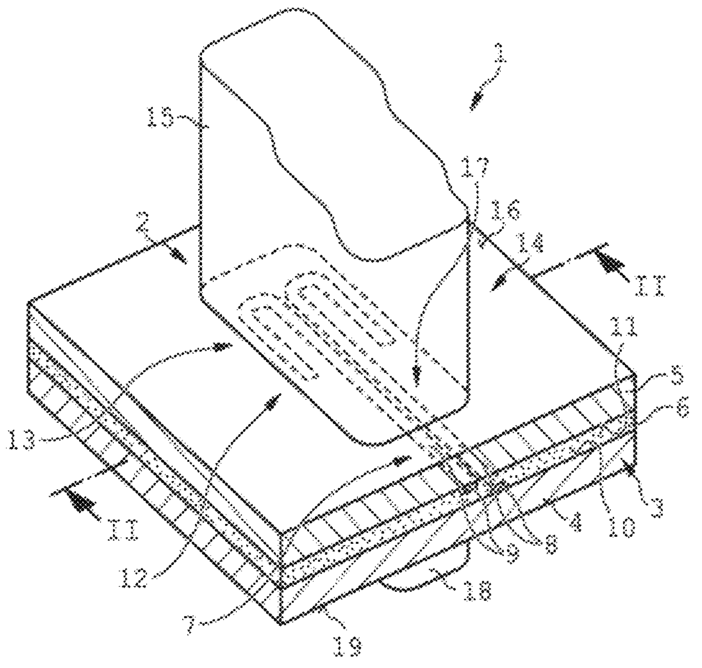
FIG. 1 illustrates a sectional view of a transition unit of a radio frequency device with an arrangement of two substrate layers.
Figure 2:
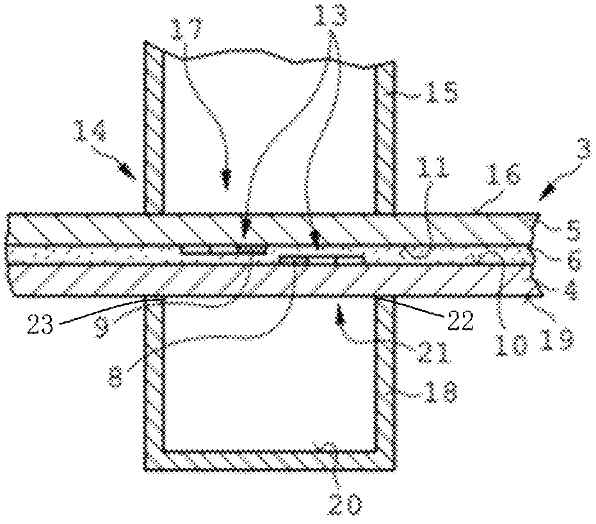
FIG. 2 illustrates a sectional view along the line II-II of the transition unit shown in FIG. 1.

In FIGS. 1 and 2 a sectional view of an exemplary part of a radio frequency device 1 with a transition unit 2 is shown. The radio frequency device 1 comprises a substrate layer arrangement 3 that comprises a first substrate layer 4 and a second substrate layer 5, each made of an electrically non-conducting material like e.g. glass. The first and second substrate layer 4, 5 are arranged parallel and spaced at a distance from each other. The volume between the first and second substrate layer 4, 5 is filled with a tunable dielectric material 6 like e.g. a liquid crystal material with variable and controllable dielectric properties. The volume between the first and second substrate layer 4, 5 can be segmented to allow for many small segments or chambers that are filled with the tunable dielectric material 6. The dielectric properties of the tunable dielectric material 6 can be controlled e.g. by applying a bias voltage to bias electrodes on opposite sides of the volume or of a small segment for which the dielectric properties of the tunable dielectric material are to be preset or modified.

A planar differential pair transmission line 7 with two parallel line sections 8, 9 of an electrically conducting material is arranged on a first surface 10 of the first substrate layer 4 and on a second surface 11 of the second substrate layer 5 of the substrate layer arrangement 3. The first surface 10 and the second surface 11 are facing each other and confine the volume between the first and second substrate layer 4, 5. The planar differential pair transmission line 7 extends into an end section 12 that is configured as a radio frequency signal emission pattern 13, resulting in a dipole-like configuration within this embodiment.

An end section 14 of a hollow waveguide 15 made from an electroconductive material is also arranged on a first outer surface 16 of the substrate layer arrangement 3. An open end 17 of the end section 14 of the hollow waveguide 15 superposes the radio frequency signal emission pattern 13 of the end section 12 of the planar differential pair transmission line 7, as can be seen in FIG. 2. Thus, a radio frequency signal that is transmitted along the planar differential pair transmission line 7 towards the end section 12 will be emitted from the frequency signal emission pattern 13. A part of the emitted signal power will be directed through the open end 17 and into the hollow waveguide 16. Another part of the emitted signal power will be directed into an opposite direction.

Opposite to the end section 14 of the hollow waveguide 15, there is a back cavity 18 that is mounted onto a second outer surface 19 of the substrate layer arrangement 3, whereby the second outer surface 19 is opposite to the first outer surface 16 of the substrate layer arrangement 3. A distance between the second outer surface 19 of the substrate layer arrangement 3 and a back side 20 of the back cavity 18 that opposes the second outer surface 19 is larger than the distance between opposing parts around the open end 21 of the back cavity 18, i.e. larger than a distance between opposing wall sections 22, 23 around the open end 21 of the back cavity 18.

A shape of the open end 21 of the back cavity 18 equals the shape of the open end 17 of the hollow waveguide 15. Furthermore, the open end 21 of the back cavity 18 is positioned opposing to the end section 14 of the hollow waveguide 15 in a manner as to fully superimpose the open end 17 of the hollow waveguide 15. A large part of the signal power that is directed into the direction of the back cavity 18 will be reflected and fed into the hollow waveguide 15. By adding the back cavity 18 to the transition unit 2, an unwanted leakage of radio frequency signal emission from the transition unit 2 can be significantly reduced.

Figure 3:
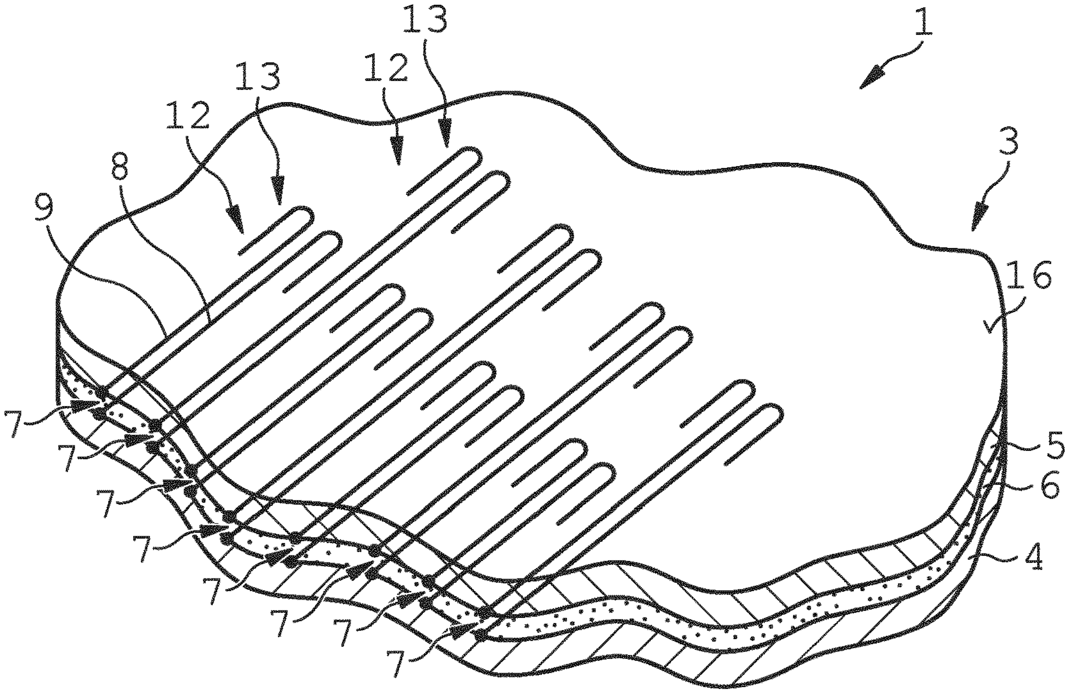
FIG. 3 illustrates a perspective view of several planar differential pair transmission lines arranged within a substrate layer arrangement adjacent to each other.
Figure 4:
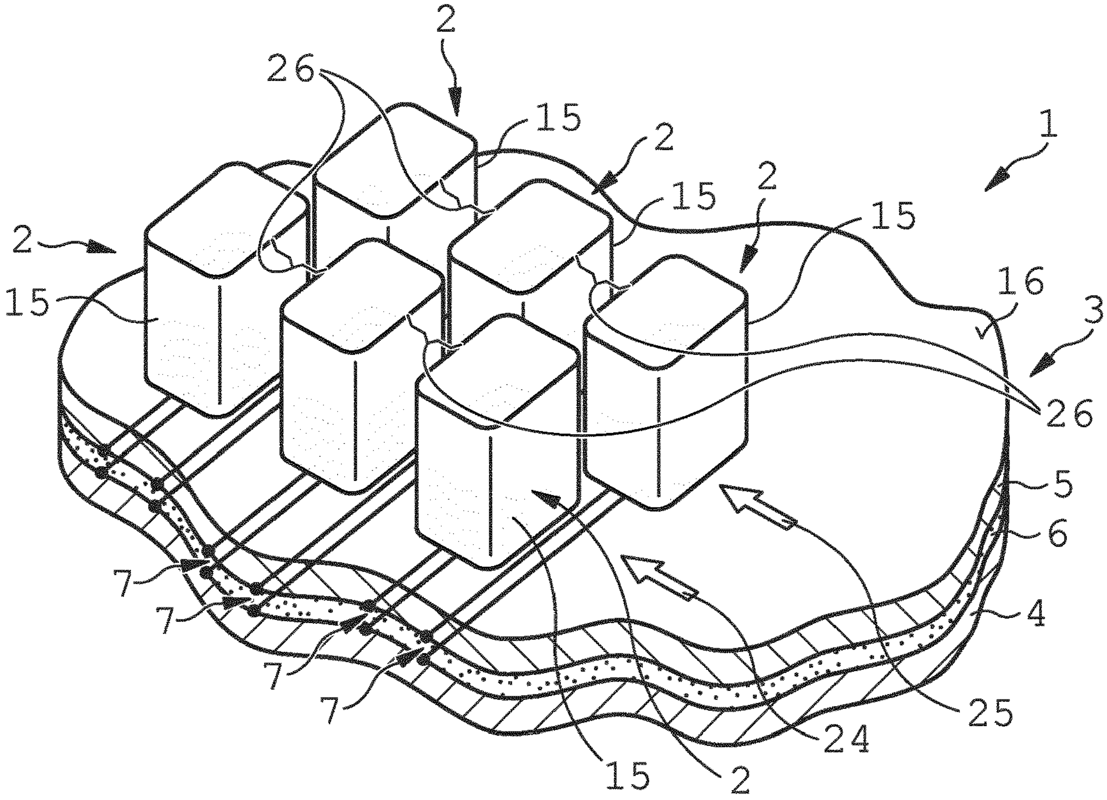
FIG. 4 illustrates a perspective view of the substrate layer arrangement of FIG. 3.

FIGS. 2, 3 and 4 show a part of a radio frequency device 1 with several transition units 2 arranged in two rows 24, 25 along the first surface 10 of the first substrate layer 4 and along the second surface 11 of the second surface 5 of the substrate layer arrangement 3. In FIG. 3 the transition units 2 are shown without hollow waveguides 15 and without back cavities 18. In FIG. 4 the same transition units 2 are shown with hollow waveguides 15 and back cavities 18, whereby the end sections 14 of the hollow waveguides 15 and the respective open ends 21 of the back cavities 18 each superpose the frequency signal emission patterns 13 of the corresponding planar differential pair transmission lines 7.

A distance between adjacent transition units 2 of the first row 24 and of a second row 25 is larger than the lateral extension of each of the hollow waveguides 15 of the adjacent transition units 2. Thus, there is a gap 26 between adjacent hollow waveguides 15 along the first row 24 as well as along the second row 25. The transition units 2 of the first row 24 are arranged within a corresponding gap 26 between adjacent transition units 2 of the second row 25, and vice versa. The planar differential pair transmission lines 7 that extend towards the transition units 2 of the second row 25 are arranged within the gap 26 between adjacent transition units 2 of the first row 24.

Figure 5:
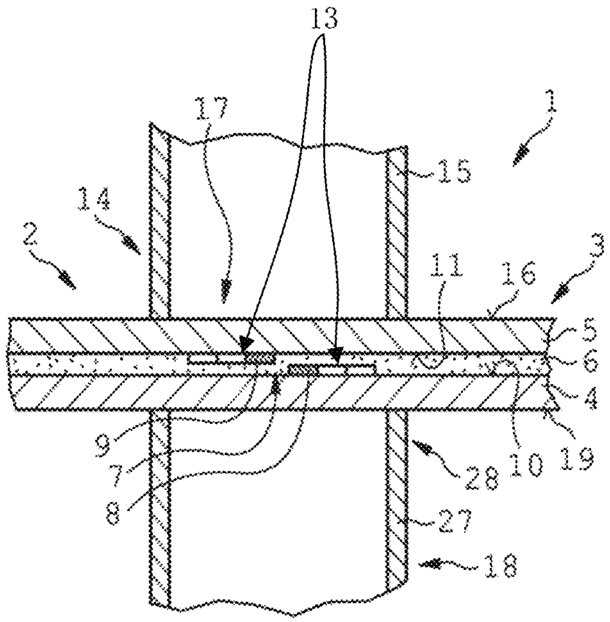
FIG. 5 illustrates another embodiment of a transition unit with a first hollow waveguide and a second hollow waveguide arranged on the substrate layer arrangement opposing towards each other.

FIG. 5 illustrates another embodiment of the transition unit of a radio frequency device 1. A second hollow waveguide 27 is used as the back cavity 18. Most of the radio frequency signal emission from the frequency signal emission pattern 13 will be directed either into the first hollow waveguide 15 that is arranged on the first outer surface 16 of the substrate layer arrangement 3 or into the second hollow waveguide 27 that is arranged on the second outer surface 19 of the substrate layer arrangement 3 opposing the first hollow waveguide 15. The undesired leakage of radio frequency signal emission from the transition unit 2 will be significantly reduced. A signal transmission direction within the end section 14 of the first hollow waveguide 15 is opposite to a signal transmission direction within an end section 28 of the second waveguide 27.

The invention claimed is:

1. A radio frequency device (1) with a transition unit (2) providing a transition from a planar differential pair transmission line (7) to a hollow radio frequency waveguide (15, 27), the radio frequency device (1) comprising a substrate layer arrangement (3) with a planar differential pair transmission line (7) arranged on one or more surfaces (10, 11) of at least one substrate layer (4, 5) of the substrate layer arrangement (3), and with the transition unit (2) comprising an end section (12) of the differential pair transmission line (7) that is configured as a radio frequency signal emission pattern (13), the transition unit (2) further comprising an end section (14) of the waveguide (15) for radio frequency electromagnetic waves that is attached to the substrate layer arrangement (3) and that superposes the radio frequency signal emission pattern (13), wherein the end section (14) of the waveguide (15) is directed perpendicular to the one or more surfaces (10,

11) of the substrate layer arrangement (3) with the planar differential pair transmission line (7), wherein an open end (17) of the end section (14) of the waveguide (15) is attached to a first outer surface (16) or a second outer surface (19) of the substrate layer arrangement (3), and wherein opposite to the end section (14) of the waveguide (15), a back cavity (18) is attached with an open end (21) of the back cavity (18) to the substrate layer arrangement (3), whereby the back cavity (18) prevents a part of radio frequency signal emission that is emitted from the emission pattern (13) from leaking outside of the end section (14) of the waveguide (15);

the radio frequency device (1) comprises several transition units (2) arranged adjacent to each other;

the several transition units (2) are arranged in two or more rows (24, 25) extending in parallel and at a distance towards each other;

a distance (26) between adjacent transition units (2) of a first row (24) of the two or more rows or of a second row (25) of the two or more rows is larger or identical to a lateral extension of the transition units (2) and wherein at least some of the transition units (2) of the first row (24) are arranged within a corresponding gap (26) between adjacent transition units (2) of the second row (25).

2. The radio frequency device (1) according to claim 1, wherein a cross-section area of the open end (21) of the back cavity (18) and a cross-section area of the open end (17) of the end section (14) of the waveguide (15) are identical and wherein the open end (21) of the back cavity (18) superposes the open end (17) of the end section (14) of the waveguide (15).

3. The radio frequency device (1) according to claim 1, wherein the end section (14) of the waveguide (15) is a first end section (14) of a first waveguide (15), and wherein the back cavity (18) is a second end section (28) of a second waveguide (27) that is directed into an opposite direction of the first end section (14) of the first waveguide (15), whereby a part of the radio frequency signal emission that is emitted from the emission pattern (13) is transmitted into the second end section (28) of the second waveguide (27).

4. The radio frequency device (1) according to claim 1, wherein a distance between the planar differential pair transmission line (7) and a back side (20) of the back cavity (18) that opposes the first or second surface (10, 11) of the substrate layer arrangement (3) is larger than at least one distance between opposing parts (22, 23) of a circumferential line of a cross-section of the open end (21) of the back cavity (18).

5. The radio frequency device (1) according to claim 1, wherein a design of each of two or more back cavities (18) associated with the same transition units (2) that are arranged adjacent to each other is identical.

* * * * *